Figure 1:
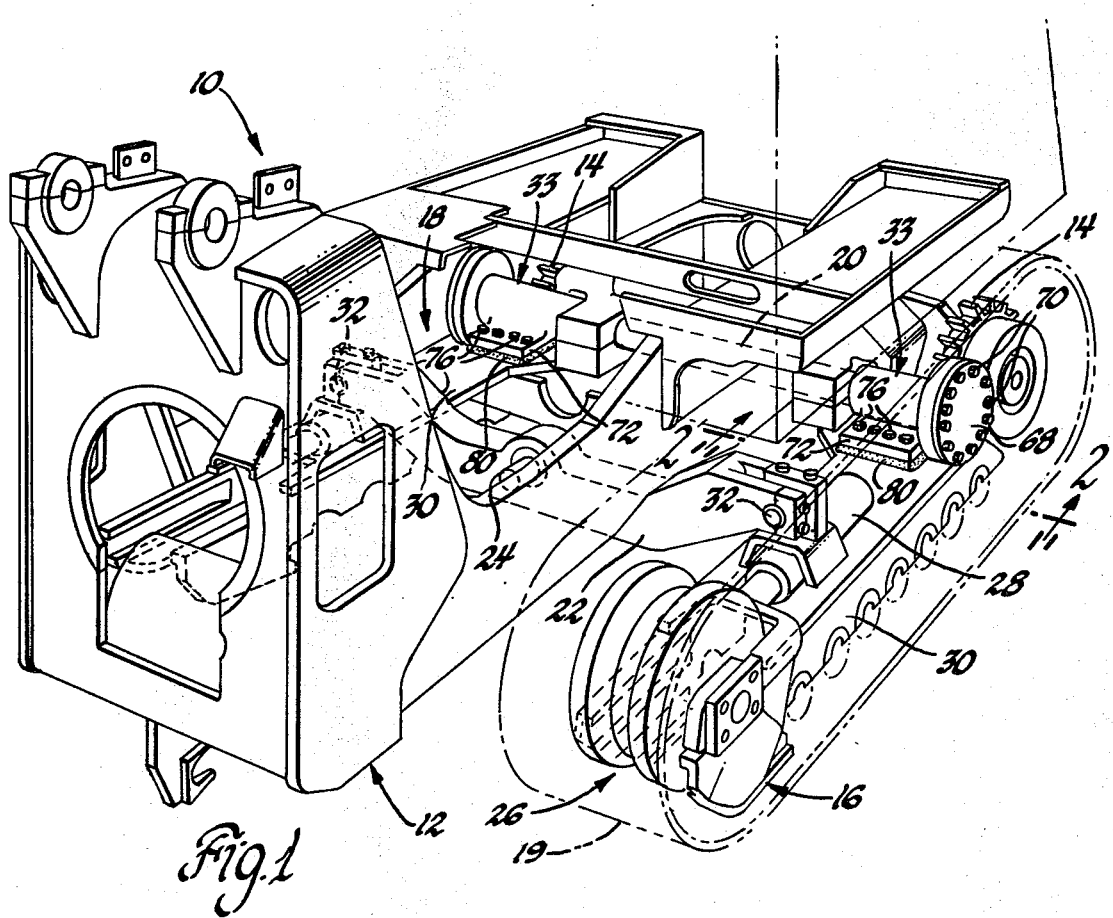

United States Patent [19]

Halterman, Jr.

[11] 4,137,981
[45] Feb. 6, 1979

[54] PIVOT SHAFT ROLLER FRAME SUPPORT

[75] Inventor: Francis J. Halterman, Jr., Ravenna, Ohio

[73] Assignee: General Motors Corporation, Detroit, Mich.

[21] Appl. No.: 853,275

[22] Filed: Nov. 21, 1977

[51] Int. Cl.² ............................................. B62D 55/14
[52] U.S. Cl. .......................................... 180/9.5; 305/12
[58] Field of Search .................. 180/9.5, 9.2 R, 9.2 C, 180/9.42; 305/12, 28, 27

[56] References Cited

U.S. PATENT DOCUMENTS

| 3,735,830 | 5/1973 | Talley | 180/9.5 |
| 4,006,940 | 2/1977 | Hacterman | 305/12 |

Primary Examiner—Philip Goodman

Attorney, Agent, or Firm—Edward J. Biskup

[57] ABSTRACT

A roller frame support arrangement for a crawler tractor that includes a hub member secured to the roller frame and having a bore formed therein for receiving one end of an axle shaft. Bushing means are located in the bore and are interposed between the hub member and the axle shaft for absorbing radially directed loading. In addition, the hub member is formed with a radially extending flange located at its outer end that accommodates a disk-type plate fastened to the axle shaft. The disk-type plate has a pair of laterally spaced bearing surfaces for absorbing thrust loads imposed upon the roller frame. An end cap is secured to the flange and together with the latter provides a pair of bearing surfaces for engaging the disk-type plate.

3 Claims, 3 Drawing Figures

U.S. Patent  Feb. 6, 1979  4,137,981

PIVOT SHAFT ROLLER FRAME SUPPORT

This invention relates to crawler tractors and more particularly concerns a roller frame support arrangement having a hub member adapted to be mounted to the outer end of a pivot shaft and serving to support the roller frame for oscillating movement while absorbing radial and thrust loading during operation of the tractor.

More specifically, the invention is incorporated in a crawler tractor vehicle that has a main frame provided with a pair of laterally spaced roller frames disposed on opposite sides of the main frame. A transversely extending pivot shaft is rigidly connected to the main frame and has the opposite ends thereof provided with axle shafts each of which is formed with a cylindrical outer surface and an end surface which lies in a plane perpendicular to the longitudinal center axis of the pivot shaft. Support means, made in accordance with the invention, connect the rear end of each of the roller frames to the pivot shaft for vertical swinging movement relative to the main frame. In addition, a transversely extending equalizer bar is pivotally connected at its midpoint to the forward end of the main frame for movement about a longitudinal axis and has the opposite ends mounted on the roller frames for maintaining the latter in spaced relation during pivotal movement about the pivot shaft. The support means is characterized in that it includes a hub member that is secured to the associated roller frame and is formed with a bore defined by a cylindrical inner wall for receiving the axle shaft. The hub member has an inner end adapted to be located adjacent the main frame and an outer end formed with a radially extending flange. A bearing assembly is mounted in the bore and interposed between the hub member and the axle shaft and includes a sleeve type bushing fixedly supported by the inner wall of the bore. The bushing is formed with a cylindrical inner bearing surface which engages the outer surface of the axle shaft and thereby allows the bushing to absorb radial loads. The end surface of the axle shaft rigidly supports a disk-type plate having a diameter greater than the diameter of the axle shaft and includes a pair of laterally spaced flat outer bearing surfaces located in planes parallel to the end surface of the axle shaft for absorbing thrust loads. Finally, an end cap is secured to the flange and together with the latter provides a pair of parallel bearing surfaces which engage the disk-type plate secured to the axle shaft.

The objects of the present invention are to provide a new and improved support member for the roller frame of a crawler tractor that is mountable on the end of the pivot shaft and allows pivotal movement of the roller frame in a vertical plane; to provide a new and improved support for connecting the roller frame to the pivot shaft and includes a resilient member for cushioning shock loads imposed upon the roller frame; to provide a new and improved mounting for joining the roller frame to one end of the pivot shaft of a crawler tractor that is characterized by having an enlarged circular flange provided with a recess for accommodating a disk-type plate secured to the end of the pivot shaft for absorbing thrust loads; to provide a new and improved track roller frame mounting which includes a hub member having the outer end thereof formed with an enlarged flange that together with an end cap houses a thrust plate which is secured to the pivot shaft; and to provide a new and improved support means which is connected to one end of a crawler tractor roller frame and serves to support the latter for pivotal movement about a horizontal axis, while at the same time, is capable of absorbing both radial and axial loading during the operation of the crawler tractor.

Figure 2:
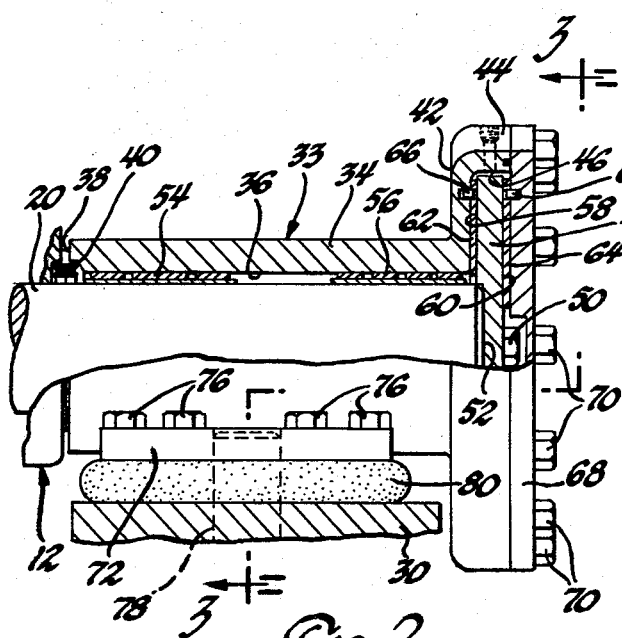
Figure 3:
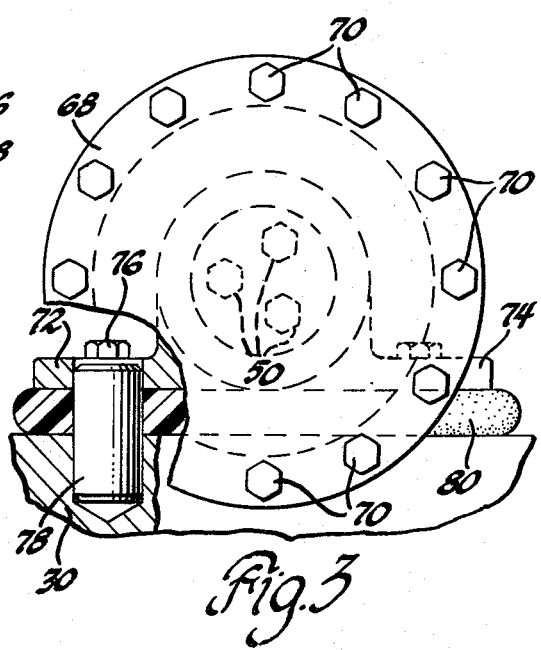

Other objects and advantages of the present invention will be apparent from the following detailed description when taken with the drawings in which:

FIG. 1 is a perspective view showing in skeleton form the main frame section and the undercarriage of a crawler tractor having a track roller frame support means in accordance with the invention, FIG. 2 is an enlarged sectional view taken on lines 2—2 of FIG. 1 showing the details of construction of one of the track roller frame support means incorporated with the crawler tractor, and FIG. 3 is an end view partly in section taken on lines 3—3 of FIG. 2.

Referring to the drawings and more particularly FIG. 1, a crawler tractor 10 is shown in skeleton form having a main frame 12 which is adapted to support the usual engine for providing drive to a pair of drive sprocket wheels located on the opposite sides of the vehicle identified by the reference numeral 14. Crawler tractors of this type can be provided with a dozer assembly that is adjustable to various operating positions through the usual lift and tilt cylinders. Reference is made to U.S. Pat. No. 4,006,940 which issued on February 8, 1977 and discloses a crawler tractor of this type having all of the parts normally associated therewith mounted on the main frame.

The opposite sides of the main frame 12 are provided with a pair of laterally aligned and longitudinally spaced track frame assemblies 16 and 18 each of which is adapted to have an endless ground engaging track 19 entrained thereabout as is shown in phantom lines. The track frame assemblies 16 and 18 are mounted for vertically swinging movement on the opposite ends (hereinafter referred to as axle shafts) of a transversely extending pivot shaft 20 which is rigidly secured at its midportion to the main frame 12 of the tractor. The pivot shaft 20 is aligned in parallel relation with the axis of rotation of the drive sprocket wheel 14, the latter of which is rotatably supported by the main frame 12 in longitudinal alignment with the associated track frame assembly. In order to support the forward ends of the track frame assemblies in a normal horizontal position as well as prevent spreading and converging of the track frame assemblies, a transversely extending equalizer bar 22 is provided which is pivotally connected at its midpoint to a longitudinally extending pivot pin 24 carried by the main frame 12 of the tractor.

Each track frame assembly 16 and 18 includes a front idler assembly 26, a pair of carrier rollers (not shown), a recoil cylinder 28, a plurality of identical track rollers (not shown) and a track roller frame 30. As is usually the case, the track 19 envelopes the track roller frame 30 and would take the form of a continuous chain composed of two rows of identical links held together by pins and bushings.

From the above description, it should be apparent that each of the track frame assemblies 16 and 18 is capable of pivoting about a horizontal axis that is coincidental with the longitudinal center axis of the pivot shaft 20. During such movement, the equalizer bar 22 controls movement of the forward end of the track roller frame 30 that that the latter moves in a vertical plane that is substantially parallel to the longitudinal axis of the main frame 12 of the crawler tractor. To this end, a pin and slot connection 32 is provided at each end of the equalizer bar 22 for joining the latter to the upper portion of the associated track roller frame.

As alluded to hereinbefore, the rear portion of each track roller frame 30 is connected to the associated end or axle shaft of the pivot shaft 20 for movement about a horizontal axis. The connection is provided through a support arrangement 33 which is shown in detail in FIGS. 2 and 3 and includes a hub member 34 that has a cylindrical bore formed therein that is defined by a cylindrical inner surface 36. The hub member 34 has an inner end 38 located in a plane that is perpendicular to the longitudinal center axis of the pivot shaft 20 and is positioned adjacent to the main frame 12. Sealing means 40 are provided for preventing dirt and other foreign particles from entering into the cylindrical bore area of the hub member 34.

The outer end of the hub member 34 is integrally formed with a radially extending flange 42 that is integral with and merges with an axially extending portion 44 so as to define a circular recess or pocket 46. The pocket 46 serves to accommodate a disk-type plate 48 centrally secured through a plurality of cap screws 50 to the flat end surface 52 of the pivot shaft 20. A pair of sleeve type bushings 54 and 56 are laterally spaced along the length of the axle shaft and are interposed between the inner cylindrical surface 36 of the hub member 34 and the outer surface of the axle shaft. The bushings 54 and 56 serve to absorb radial loads imposed upon the associated axle shaft portion of the pivot shaft 20.

The disk-type plate 48 has a pair of parallel inner and outer bearing surfaces 58 and 60 respectively which are continuously in contact with a pair of thrust washers 62 and 64 positioned within the pocket 46 of the hub member 34 through a plurality of circumferentially spaced dowel pins, two of which are shown in FIG. 2 and are identified by the reference numeral 66. It will be noted that the thrust washer 64 is supported by an end cap member 68 which is fastened to the portion 44 of the hub member 34 through a plurality of circumferentially spaced cap screws 70.

The hub member is fastened to the upper portion of the associated roller frame through a pair of integral legs 72 and 74 which extend in opposite direction along the longitudinal axis of the roller frame. As seen in FIGS. 2 and 3, the legs 72 and 74 are rigidly fastened to the top surface of the associated roller frame through cap screws 76, and dowel pins 78 are provided in each of the legs for correct positioning thereof in relation to the roller frame and also serve to absorb thrust loads. In addition, interposed between the legs 72 and 74 and the upper surface of the roller frame is a pad 80 of elastomeric material which serves to minimize shock loading from being transmitted through the roller frame to the main frame 12 of the crawler tractor.

As should be apparent from the above description, the track roller frame support arrangement 33 serves to absorb both radial and thrust type loading which is imposed upon the associated roller frame. In addition, the construction permits the roller frame to oscillate about a horizontal axis and when combined with the resilient pad, minimizes the transmission of shock type loads to the main frame of the tractor. It should be apparent that the use of the resilient pad is not required to practice the invention, inasmuch as it would be possible to realize the principal advantages of the support arrangement 33 through a direct connection of the legs 72 and 74 to the roller frame.

Various changes and modifications can be made in this construction without departing from the spirit of the invention. Such changes and modifications are contemplated by the inventor and he does not wish to be limited except by the scope of the appended claims.

I claim:

1. In a crawler tractor vehicle having a main frame provided with a pair of laterally spaced track frames disposed on opposite sides of said main frame, a transversely extending pivot shaft rigidly connected to said main frame and having the opposite ends thereof provided with axle shafts each of which is formed with a cylindrical outer surface and an end surface, support means connecting the rear end of each of said track frames to said pivot shaft for vertical swinging movement relative to said main frame, a transversely extending equalizer bar pivotally connected to the forward end of said main frame on a longitudinal axis and having the opposite ends operatively associated with the front ends of said track frames for maintaining the latter in spaced relation during pivotal movement about said pivot shaft, the improvement wherein said support means comprises a hub member secured to the associated track frame and having a bore formed therein defined by a cylindrical inner wall for receiving each of said axle shafts, said hub member having an inner end adapted to be located adjacent the main frame and an outer end, a radially extending flange integrally formed with the outer end of said hub member, a bearing assembly mounted in said bore and interposed between the hub member and the axle shaft for absorbing radial loads, a disk-type plate having a diameter greater than the diameter of the axle shaft centrally secured to the end surface and having a pair of laterally spaced outer bearing surfaces for absorbing thrust loads, and an end cap secured to said flange and together with the latter providing a pair of bearing surfaces for engaging said disk-type plate.

2. In a crawler tractor vehicle having a main frame provided with a pair of laterally spaced track frames disposed on opposite sides of said main frame, a transversely extending pivot shaft rigidly connected to said main frame and having the opposite ends thereof provided with axle shafts each of which is formed with a cylindrical outer surface and an end surface, support means connecting the rear end of each of said track frames to said pivot shaft for vertical swinging movement relative to said main frame, a transversely extending equalizer bar pivotally connected to the forward end of said main frame on a longitudinal axis and having the opposite ends operatively associated with the front ends of said track frames for maintaining the latter in spaced relation during pivotal movement about said pivot shaft, the improvement wherein said support means comprises a hub member secured to the associated track frame and having a bore formed therein defined by a cylindrical inner wall for receiving each of said axle shafts, said hub member having an inner end adapted to be located adjacent the main frame and an outer end, a radially extending flange integrally formed with the outer end of said hub member, a bearing assembly mounted in said bore and interposed between the hub member and the axle shaft, said bearing assembly including a sleeve type bushing fixedly supported by said inner wall and having a cylindrical inner bearing surface for engaging the outer surface of the axle shaft and absorbing radial loads, a disk-type plate having a diameter greater than the diameter of the axle shaft centrally secured to the end surface and having a pair of laterally spaced flat outer bearing surfaces located in planes parallel to said end surface for absorbing thrust loads, and an end cap secured to said flange and together with the latter providing a pair of parallel bearing surfaces for engaging said disk-type plate.

3. In a crawler tractor vehicle having a main frame provided with a pair of laterally spaced track frames disposed on opposite sides of said main frame, a transversely extending pivot shaft rigidly connected to said main frame and having the opposite ends thereof provided with axle shafts each of which is formed with a cylindrical outer surface and an end surface lying in a plane perpendicular to the longitudinal center axis of said pivot shaft, support means connecting the rear end of each of said track frames to said pivot shaft for vertical swinging movement relative to said main frame, a transversely extending equalizer bar pivotally connected at its midportion to the forward end of said main frame on a longitudinal axis and having the opposite ends operatively associated with the front ends of said track frames for maintaining the latter in spaced relation during pivotal movement about said pivot shaft, the improvement wherein said support means comprises a hub member secured to the associated track frame resilient means located between said hub member and said associated track frame, said hub member having a bore formed therein defined by a cylindrical inner wall for receiving each of said axle shafts, said hub member having an inner end adapted to be located adjacent the main frame and an outer end, a radially extending flange integrally formed with the outer end of said hub member, a bearing assembly mounted in said bore and interposed between the hub member and the axle shaft, said bearing assembly including a sleeve type bushing fixedly supported by said inner wall and having a cylindrical inner bearing surface for engaging the outer surface of the axle shaft and absorbing radial loads, a disk-type plate having a diameter greater than the diameter of the axle shaft centrally secured to the end surface and having a pair of laterally spaced flat outer bearing surfaces located in planes parallel to said end surface for absorbing thrust loads, and an end cap secured to said flange and together with the latter providing a pair of parallel bearing surfaces for engaging said disk-type plate.

* * * * *